Sept. 20, 1966  G. H. LUKE  3,273,431
AUTOMATIC LATHES AND LIKE MACHINE TOOLS
Filed May 19, 1964  2 Sheets-Sheet 1

Inventor
George Henry Luke
by Albert V. Jacks
Attorney

Sept. 20, 1966 G. H. LUKE 3,273,431
AUTOMATIC LATHES AND LIKE MACHINE TOOLS
Filed May 19, 1964 2 Sheets-Sheet 2

Inventor
George Henry Luke
by Albert L. Jackes
Attorney

United States Patent Office 3,273,431
Patented Sept. 20, 1966

3,273,431
AUTOMATIC LATHES AND LIKE MACHINE TOOLS
George Henry Luke, Bristol, England, assignor to Bristol Repetition Limited, Bristol, England, a company of Great Britain and Northern Ireland
Filed May 19, 1964, Ser. No. 368,466
Claims priority, application, Great Britain, May 20, 1963, 19,929/63
4 Claims. (Cl. 82—2.5)

This invention relates to automatic lathes and like machine tools of the kind in which a metal bar is fed through a hollow stock tube in order that repetition parts may be machined and cut off the bar successively, the bar being fed through the hollow stock tube.

It has always been a problem with machine tools of the kind referred to that the metal rod may be used up before the operator notices it, with the result that there is a loss of production. It may also happen that the final end portion of the rod that is fed to the machine is too short to produce a full-length part; this may, and often does, cause damage to the cutting tools and other parts of the machine.

There have been many attempts made to provide means whereby a warning is given that the rod is becoming used up or exhausted, and/or for stopping the machine automatically in such circumstances, but none of them has been wholly satisfactory.

The object of the present invention is to provide improvements in machine tools of the kind referred to.

An automatic machine tool of the kind referred to comprises an element movable to disengage the working parts of the machine from the machine drive, a pivoted trip lever movable for actuation of said element, a rotary calibrated cylinder provided with a trip dog adapted to engage and operate said trip lever, a pawl and ratchet device for rotating the calibrated cylinder unidirectionally and step by step, said pawl element being reciprocable once for each operation cycle of the machine, each calibration unit on the cylinder indicating a single operation cycle of the machine and the ratchet being arranged to move the cylinder through one calibration unit for each stepwise actuation by the pawl, spring means to rotate the cylinder contra to the driving direction effected by the pawl and ratchet device, stop means to retain the cylinder, whilst urged by said spring means, in a normal position with a zero calibration mark thereon in registration with a fixed indicator, the position of said trip dog being adjustable on said cylinder, a pivotally mounted feeler adapted to oscillate across the mouth of the stock tube, spring means for moving the feeler in one angular direction of its oscillation, a pin connected to said feeler and mounted to hold the pawl out of engagement with the ratchet, a dog connected to the feeler, an arm mounted to reciprocate and for an end thereof to abut the said dog on the feeler when said arm is at or near the end of a movement to project said arm end, and means including a cam driven by the machine to effect reciprocation of said arm.

One embodiment of the invention is shown in the accompanying drawings, wherein.

Figure 1:
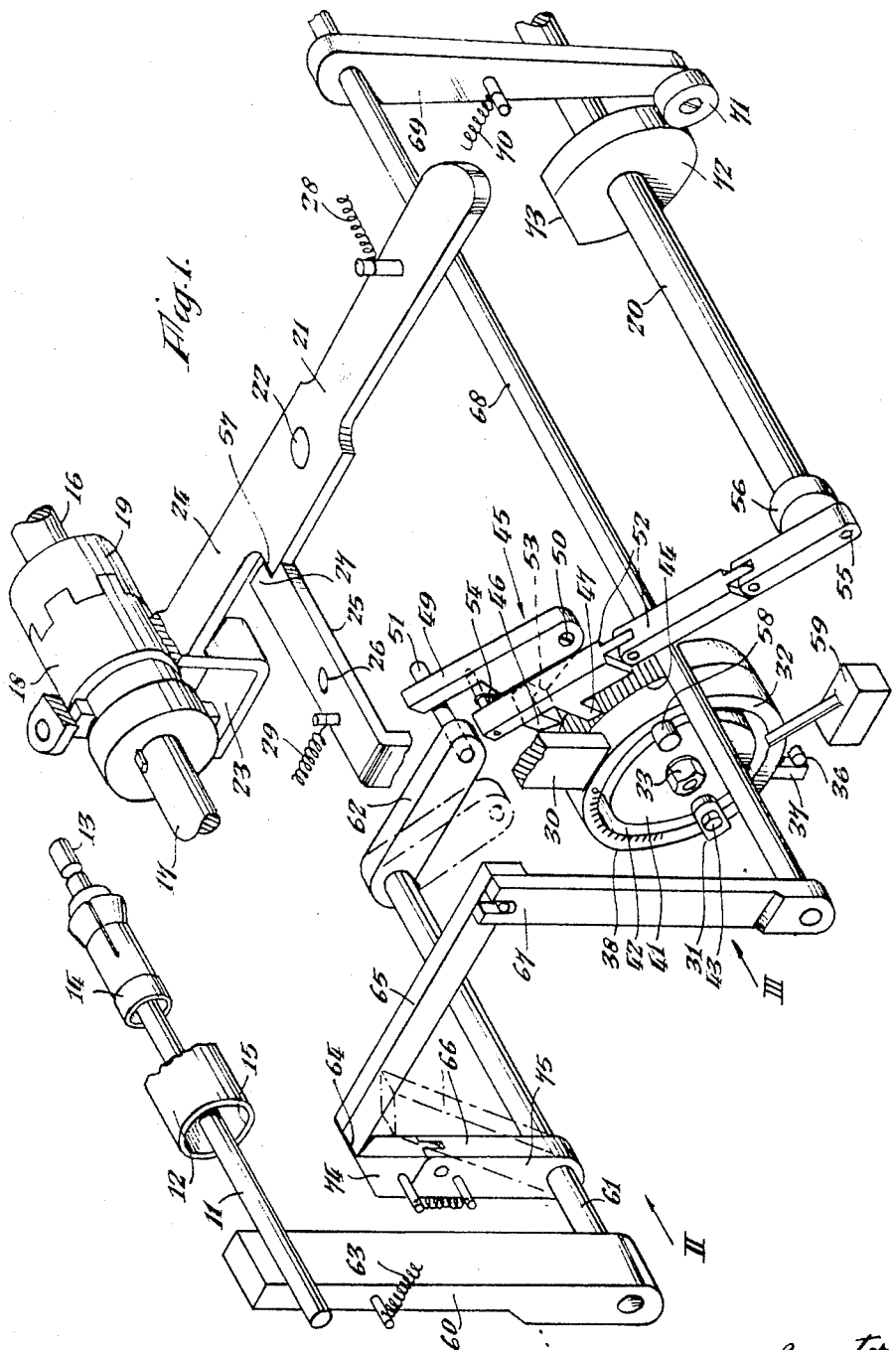
FIG. 1 is a schematic perspective view of the apparatus.

The embodiment of the invention shown in the drawings is applied to a multi-operation lathe (not shown) which is adapted to produce repetition articles from a bar 11 which is fed to the lathe through a stock tube 12. Short bar portions 13 are initially parted-off from the bar 11, and such portions subsequently are operated upon in the lathe whereby to fashion the desired article. A collet 14 is assoicated with the stock tube 12, or is attached to or is part of said tube, for the purpose of holding the end of the bar 11 at the outlet or tail-end of the stock tube. The stock tube 12 also has an inlet end or mouth 15 through which the bar 11 is introduced to the tube.

The lathe is provided with a driven shaft 16, from which all the parts of the lathe are driven, and a driving shaft 17 is connected to the driven shaft 16 by a dog clutch 18–19, the clutch element 18 being slidable axially on the driving shaft 17 to withdraw it from engagement with the clutch element 19 on the driven shaft 16 in order to disconnect the shafts 16 and 17 from each other.

A camshaft 20 is connected to some portion of the lathe mechanism so as to be rotated once for each cycle of operations effected by the lathe, that is, the production of one article by the lathe.

The elements 16–20 will be devised and arranged to suit the particular machine with which they are assoicated, and the arrangement thereof is not part of the present invention.

A clutch lever 21 is mounted on a pivot 22 with a fork 23 on one arm 24 thereof engaging the slidable clutch element 18 so to move the clutch element 18 to disengage the shafts 16 and 17 and thus stop the operation of the lathe.

A trip lever 25 is mounted on a pivot 26 and has one end 27 thereof adapted to engage a tooth 57 on the arm 24 of the clutch lever 21 whereby to retain the lever 21, against the action of a spring 28, in the position with the fork 23 holding the clutch elements 18 and 19 in engagement with each other. The trip lever 25 is retained in the said position with its end 27 engaging the clutch lever arm 24 by a spring 29. The other end 30 of the trip lever 25 is formed and positioned to be engaged or abutted by a dog 31 on a calibrated cylinder 32.

The cylinder 32 is mounted for rotation on a spindle 33, and a spring 34 is provided therein to effect rotation of the cylinder in the direction of the arrow 35. A fixed stop 36 is provided on the apparatus to be abutted by a stop 37 of the cylinder 32 to locate the cylinder in a normal position whilst urged by said spring 34. The cylinder 32 bears, around its periphery or otherwise, calibrated markings 38, the units of which correspond to the working cycles of the lathe, that is, one unit per cycle. When the cylinder 32 is located in the said normal position with the stops 36, 37 abutting each other, the zero mark on the cylinder registers with a fixed mark 39 on the apparatus.

The dog 31 is mounted to project from the front face 41 of the cylinder 32, and the said dog is movable around the cylinder, in a slot 42, to locate the dog at a position corresponding to a chosen number of units of said calibrations, and to be then fixed, by a nut 43, at that location. The said chosen number of units corresponds to the number of articles which can be made by the lathe from a length, hereinafter described, of bar 11.

The cylinder 32 is provided with a ring of ratchet teeth 44, mounted concentrically thereon, the angular pitch of the said teeth being equal to the angular spacing of the calibration marks 38 on the cylinder. A pawl device 45 is mounted to engage the ratchet teeth 44, there being a holding pawl 46 to prevent movement of the cylinder 32 in the direction of the arrow 35, and a driving pawl 47 to effect the opposite movement of the cylinder, that is in the direction of the arrow 48. The holding pawl 46 is mounted on a pivoted arm 49, mounted on a pivot 50 on the apparatus, and the arm 49 is abutted by a pin 51, hereinafter described, which pin, when moved, will raise the holding pawl 46 out of engagement with the ratchet teeth 44. The driving pawl 47 is mounted on a bar 52 which reciprocates once for each working cycle of the lathe and engages the ratchet teeth 44 to move the cylinder 32 in the direction of the arrow 48 through the angular spacing of one calibration unit for each said working cycle. The bar 52 carrying the driving pawl 47 rides upon a shoulder 53 on the arm 49 carrying the holding pawl 46, so that both pawls 46, 47 are raised simultaneously out of engagement with the ratchet teeth 44, or allowed to be spring pressed by a spring 54, into engagement simultaneously with the ratchet teeth. Reciprocation of the driving pawl 47 is effected by mounting one end 55 of the arm bar 52, which is articulated, on an eccentric 56 which is rotated by the camshaft 20 one rotation for each working cycle of the lathe.

It will be seen that from the time when the pawls 46, 47 are placed in engagement with the ratchet teeth 44, the cylinder 32 will be caused to rotate, in the direction of the arrow 48, step by step in synchronisation with the working cycles of the lathe, each working cycle producing one repetition article, until a number of articles, equal to the said chosen number of calibration units 38, have been made, when the dog 31 on the cylinder will abut the end 30 of the trip lever 25 and thus release the trip end 27 of the said lever from engagement with the tooth 57 on the clutch lever 21 which then is urged by the spring 28 to withdraw the clutch element 19 from the element 18 and thus disconnect the shafts 16, 17 from each other.

Another dog 58 on the cylinder 32 may actuate a microswitch 59, at or subsequent to the said disengagement of the shafts 16, 17 from each other, whereby the motor driving the driving shaft 17 is stopped, and also, if desired, causing a visual or audible signal to be produced.

Figure 2:
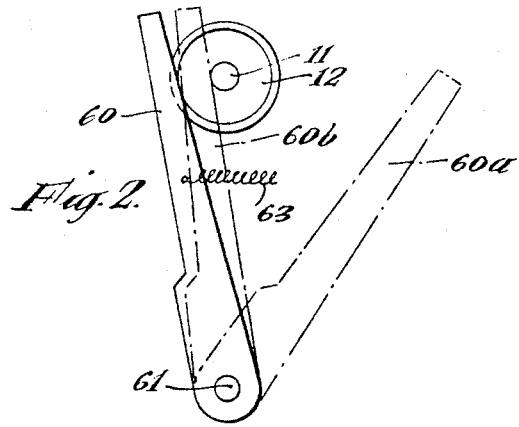
FIGS. 2 and 3 are end elevations of parts of the apparatus, looking in the directions of arrows II and III, respectively, in FIG. 1.
Figure 3:
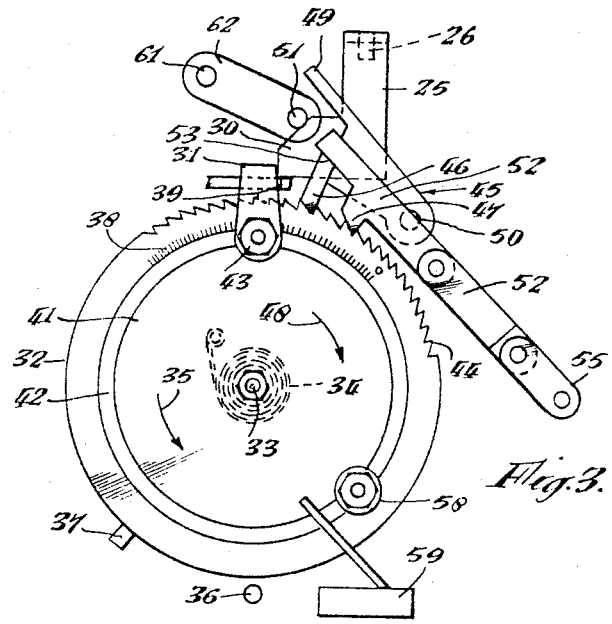

A feeler arm 60 is mounted on a shaft 61 to pivot therewith, the shaft 61 being parallel to the axis of the stock tube 12, and thus also to the stock bar 11 disposed in the stock tube, whilst the feeler arm 60 projects from the shaft 61 to such extent that the feeler arm 60 moves angularly across the mouth 15 of the stock tube, either close to or spaced therefrom. The normal position of the feeler arm 60, shown in full lines in FIG. 2, is slightly to one side of the path of the stock bar 11 and clear of said bar, and, consequently, when there is a stock bar in the stock tube 12 and projecting outwardly from the mouth 15 thereof, the stock bar will prevent the feeler arm 11 moving across the mouth of the stock tube.

Mounted on the feeler arm shaft 61 there is an arm 62 carrying the pin 51 which abuts the arm 49 carrying the holding pawl 46. When the feeler arm 60 is in the said normal position, the pin 51 holds the holding pawl 46, and also the driving pawl 47, out of engagement with the ratchet teeth 44, but when there is no stock bar 11 projecting from the mouth 15 of the stock tube 12 and across the path of the feeler arm, the feeler arm, urged by a spring 63, will move across the mouth 15 of the stock tube 12, to substantially the dotted line position 60a in FIG. 2, and the pin 51 will be moved to allow the pawls 46, 47 to come into engagement with the ratchet teeth 44. The length of stock bar 11 in the stock tube 12 at the moment the feeler bar 60 is first thus allowed to pass across the mouth 15 of the stock tube is sufficient to make a certain number of articles, and that number is equal to the chosen number of calibration marks 38 on the cylinder 32 at which the dog 31 is fixed to the cylinder.

The feeler arm 60 is held in the said normal position, so that it does not abut the stock bar 11, by the end 64 of a reciprocating arm 65 abutting a dog 66 mounted on the feeler arm shaft 61. The arm 65 is caused to reciprocate by an oscillating lever 67 which is provided, by way of a shaft 68 and a lever 69 urged by a spring 70, with a cam follower 71 engaging a rotary cam 72 mounted on the camshaft 20 to be rotated at one rotation for each working cycle of the lathe. The cam 72 has a contour of which the major portion is concentric with the camshaft 20, so that said major portion holds the reciprocating arm 65 projected for its end 64 to abut the dog 66 on the feeler arm shaft 61, and thus the feeler arm 60 is held in the normal position, out of abutment with the stock bar 11, during the major portion of the working cycle of the lathe. The cam contour also has a flat portion 73 which allows the reciprocating arm 65 to be withdrawn, under the action of the spring 70, thus allowing the feeler arm 60 to be drawn, by its spring 63, towards and on to the stock bar 11, that is, to the dotted line position 60b in FIG. 2. It will be seen, therefore, that the reciprocating arm 65 reciprocates synchronously with the working cycles of the lathe, and allows the feeler arm 60 to move towards and on to the stock bar 11 once during each said working cycle.

If there is a stock bar 11 in the stock tube 62 and projecting out of the mouth 15 thereof and across the path of the feeler arm 60, the feeler arm cannot move far enough to allow the pin 51 to release the pawls 46, 47 from disengagement with the ratchet teeth 44, and consequently the cylinder 32 cannot be rotated whilst there is a stock bar 11 so projecting from the stock tube 12.

However, as soon as the whole of the stock bar 11 has moved out of the oscillation path of the feeler arm 60, the movement of the feeler arm, when released by the reciprocating arm 65, cannot be impeded by the stock bar, and thus the feeler arm moves sufficiently, for example to the position 60a, to move the pin 65 and allow the pawls 46, 47 to engage the ratchet teeth 44. Thereupon, the cylinder 32 is rotated, stepwise, until the dog 31 thereon abuts the lever end 30 and trips the clutch lever 21 to disengage the machine lathe shaft 16 from the driving shaft 17 and, subsequently or simultaneously, to stop the drive. The interval between the starting of rotation of the cylinder 32 and the stopping of the lathe enables repetition parts to be made from the length of stock bar 11 in the stock tube 12, and the lathe is stopped immediately when, or just before, there is no more bar 11 in the stock tube 12.

During the normal procedure of placing a new stock bar 11 in the stock tube 12 the feeler arm 60 is moved back to its normal position. When the feeler arm moves forward across the mouth 15 of the stock tube, the dog 66 on the feeler arm shaft 61 moves below the path of reciprocation of the reciprocating arm 65 and thus is not subsequently abutted by the end 64 of said arm. The end portion 74 of the dog 66 may be pivotally mounted, as a trip, on an arm 75 on the feeler arm shaft 61, so that the dog can be moved back into its normal position for abutment by the end 64 of the reciprocating arm 65. The action of moving the feeler arm 60 back to its normal position automatically re-sets the rotary calibrated cylinder, under the action of the spring 34 when the ratchet teeth 44 are released from the pawls 46 and 47, ready for repeating its control of the next bar end portion.

What I claim and desire to secure by Letters Patent is:

1. An automatic machine tool of the kind in which a metal bar is fed through a hollow stock tube in order that repetition parts may be machined and cut off the bar successively, the bar being fed through the hollow stock tube, and comprising an element movable to disengage the working parts of the machine from the machine drive, a pivoted trip lever movable for actuation of said element, a rotary calibrated cylinder provided with a trip dog adapted to engage and operate said trip lever, a pawl and ratchet device for rotating the calibrated cylinder unidirectionally and step by step, said pawl element being reciprocable once for each operation cycle of the machine, each calibration unit on the cylinder indicating a single operation cycle of the machine and the ratchet being arranged to move the cylinder through one calibration unit for each stepwise actuation by the pawl, spring means to rotate the cylinder contra to the driving direction effected by the pawl and ratchet device, stop means to retain the cylinder, whilst urged by said spring means, in a normal position with a zero calibration mark thereon in registration with a fixed indicator, the position to said trip dog being adjustable on said cylinder, a pivotally mounted feeler adapted to oscillate across the mouth of the stock tube, spring means for moving the feeler in one angular direction of its oscillation, a pin connected to said feeler and mounted to hold the pawl out of engagement with the ratchet, a dog connected to the feeler, an arm mounted to reciprocate and for an end thereof to abut the said dog on the feeler when said arm is at or near the end of a movement to project said arm end, and means including a cam driven by the machine to effect reciprocation of said arm.

2. An automatic machine tool according to claim 1 wherein the said element comprises a clutch disposed between a driven shaft in the machine and a driving shaft therefor.

3. An automatic machine tool according to claim 2, comprising a clutch lever engaging one clutching member of said clutch, spring means for urging said clutch lever into the position effecting disengagement of the clutching members of said clutch, the said pivoted trip lever being disposed to engage said clutch lever and retain it in the position effecting engagement of said clutching members.

4. An automatic machine tool according to claim 2, further comprising a second trip dog on said calibrated cylinder, and a switch in an electric circuit to a motor driving the said driving shaft, the said second trip dog and the said switch being positioned relatively to each other for the said second trip dog to engage and operate said switch to break the said circuit.

References Cited by the Examiner
UNITED STATES PATENTS

| | | | |
|---|---|---|---|
| 1,877,693 | 9/1932 | Rich | 82—2.7 X |
| 3,131,587 | 5/1964 | Spohn et al. | 82—2.7 |

WILLIAM W. DYER, Jr., *Primary Examiner.*

L. VLACHOS, *Assistant Examiner.*